(12) United States Patent
Johansson et al.

(10) Patent No.: US 11,454,400 B2
(45) Date of Patent: Sep. 27, 2022

(54) FOLDED BURNER

(71) Applicant: Primus AB, Örnsköldsvik (SE)

(72) Inventors: Magnus Johansson, Solna (SE); Staffan Till, Solna (SE); Henrik Johansson, Solna (SE)

(73) Assignee: Primus AB, Örnsköldsvik (SE)

( * ) Notice: Subject to any disclaimer, the term of this patent is extended or adjusted under 35 U.S.C. 154(b) by 0 days.

(21) Appl. No.: 16/796,701

(22) Filed: Feb. 20, 2020

(65) Prior Publication Data
US 2020/0263877 A1    Aug. 20, 2020

(30) Foreign Application Priority Data

Feb. 20, 2019   (EP) ..................................... 19158212

(51) Int. Cl.
| | | |
|---|---|---|
| F24C 3/14 | (2021.01) | |
| F24C 3/08 | (2006.01) | |
| F24C 3/12 | (2006.01) | |
| F24C 15/08 | (2006.01) | |
| F24C 15/10 | (2006.01) | |

(52) U.S. Cl.
CPC ................ F24C 3/14 (2013.01); F24C 3/082 (2013.01); F24C 3/122 (2013.01); F24C 15/086 (2013.01); F24C 15/107 (2013.01)

(58) Field of Classification Search
CPC .. F24C 3/14; F24C 3/082; F24C 3/122; F24C 15/086; F24C 15/107; A47J 36/26
See application file for complete search history.

(56) References Cited

U.S. PATENT DOCUMENTS

| | | | |
|---|---|---|---|
| 3,156,379 A | | 11/1964 | Felicien |
| 3,809,054 A | * | 5/1974 | Bowman .................... F24C 3/14 126/38 |
| 3,907,490 A | * | 9/1975 | Schaller ..................... F24C 3/14 431/142 |
| 4,177,790 A | * | 12/1979 | Zenzaburo ................ F24C 3/14 126/38 |

(Continued)

FOREIGN PATENT DOCUMENTS

| | | |
|---|---|---|
| CN | 105823094 A | 8/2016 |
| FR | 1004745 A | 4/1952 |

(Continued)

OTHER PUBLICATIONS

European Search Report for European Application No. 19158212 dated Jul. 16, 2019, 7 pages.

(Continued)

*Primary Examiner* — Alfred Basichas
(74) *Attorney, Agent, or Firm* — TraskBritt

(57) ABSTRACT

A portable outdoor stove comprises a gas control valve, the gas control valve being dockable by a fuel supply means; a burner unit provided on the gas control valve; a plurality of supports attached to the portable outdoor stove, the supports being foldable at least between a first position and a second position; wherein in the first position, the supports are adapted to provide a hold for a receptacle such as a pot to be heated by the burner unit; wherein in the second position, the supports are adapted to form a cover around the burner unit such that the burner unit does not project outside the cover.

13 Claims, 6 Drawing Sheets

(56) References Cited

U.S. PATENT DOCUMENTS

| | | | | |
|---|---|---|---|---|
| 4,759,339 | A | * | 7/1988 | Hefling .................... F24C 3/14 |
| | | | | 126/38 |
| 5,954,044 | A | * | 9/1999 | Schmidt ................... F24C 3/14 |
| | | | | 126/38 |
| 6,505,620 | B1 | * | 1/2003 | Goto ........................ F24C 3/14 |
| | | | | 126/38 |
| 2009/0280447 | A1 | * | 11/2009 | Long ...................... F24C 14/00 |
| | | | | 431/123 |
| 2014/0290640 | A1 | | 10/2014 | Kim |

FOREIGN PATENT DOCUMENTS

| | | |
|---|---|---|
| GB | 2362947 A | 12/2001 |
| JP | 2002-005446 A | 1/2002 |
| JP | 2008-057915 A | 3/2008 |

OTHER PUBLICATIONS

European Search Report and Opinion for European Application No. 19158212, dated Jul. 16, 2019; 7 pages.
Japanese Notification of Reasons for Rejection for Japanese Application No. 2020-025843 dated Apr. 28, 2021, 4 pages.

* cited by examiner

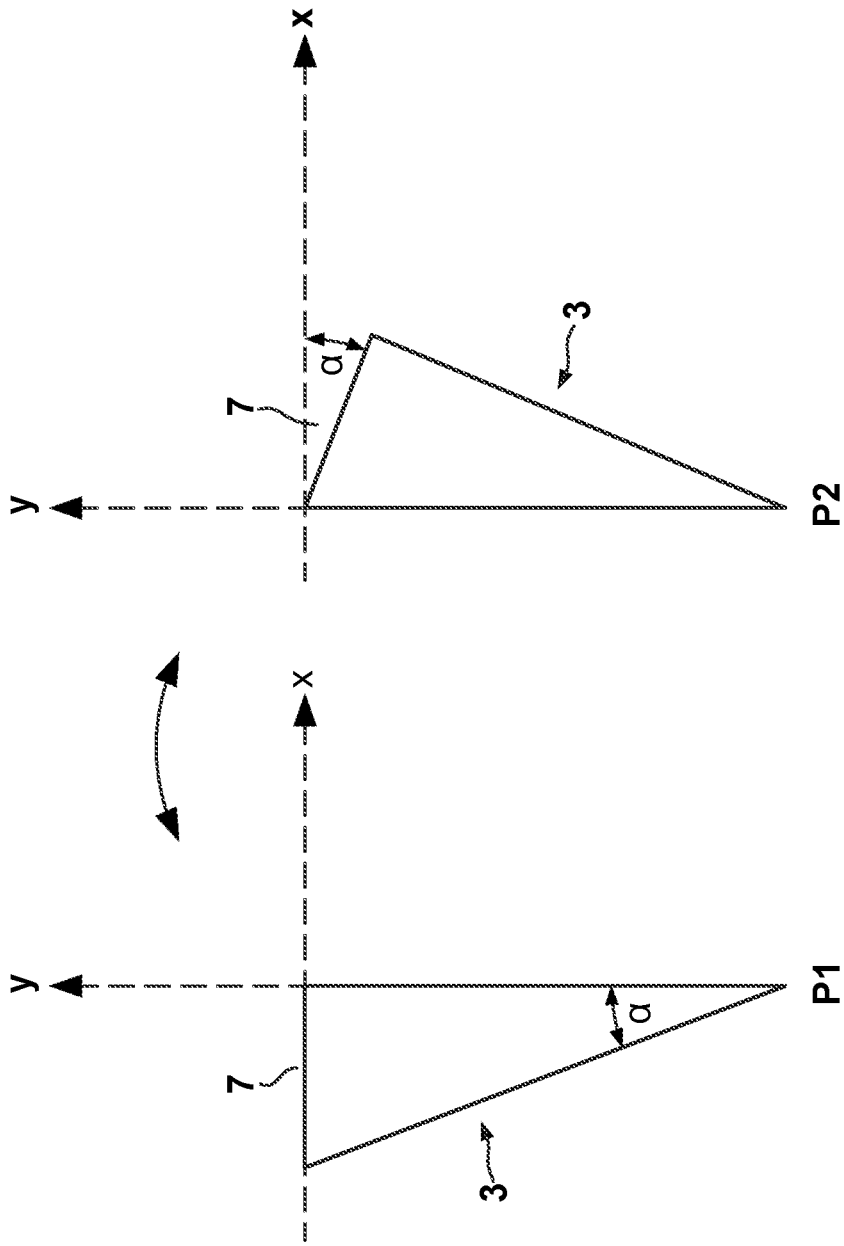

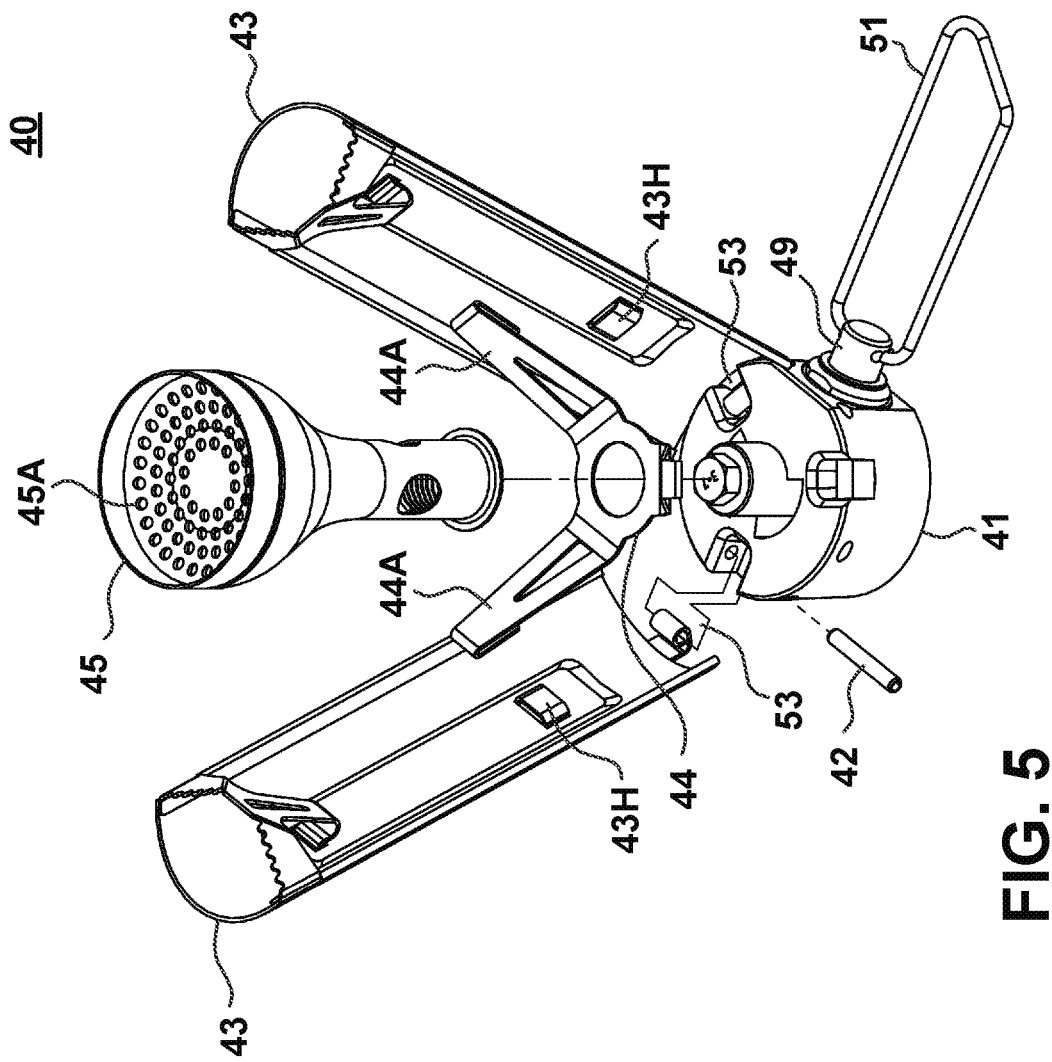

FOLDED BURNER

PRIORITY CLAIM

This application claims the benefit of the filing date of European Patent Application Serial No. 19158212.1, filed Feb. 20, 2019, for "Folded Burner," the contents of which are incorporated herein in their entirety.

TECHNICAL FIELD

The present disclosure relates to the field of outdoor stoves, such as campfire stoves, expedition stoves and trekking stoves, and, in particular, to a folded outdoor stove.

BACKGROUND

Classical portable outdoor stoves and cookers, in particular, trekking burners, are presumed to be lightweight carry on equipment, which hikers, campers and other users of such equipment may carry in their baggage, usually in their backpacks. In addition to the overall functionality, i.e., a lightweight equipment for heating or cooking food and beverages, these burners should also be compact, easy to store in the respective baggage and easy to take out from the baggage. However, baggage, in particular, backpacks, are prone to damage by any parts of the portable outdoor stove sticking out from the device. Such backpacks are often tightly packed or the user intends to pack it tightly. Thus, objects sticking out from the device, in particular, sharp or thin metal parts sticking out, may be problematic and may damage either the backpack or baggage itself or it may damage other elements stored inside the backpack. Often, these other elements are of softer material than the portable outdoor stove and may thus suffer scratches or even cuts when the portable outdoor stove is taken out from the baggage by a user. This may apply, as well, when the user puts back the portable outdoor stove into the baggage.

BRIEF SUMMARY

In view of the above, the present disclosure provides a solution to the above-mentioned limitations and problems.

The present disclosure provides: a portable outdoor stove comprising a gas control valve; a burner unit provided on the gas control valve; a plurality of supports attached to the portable outdoor stove, the supports being foldable at least between a first position and a second position; wherein in the first position, the supports are adapted to provide a secure footing for the portable outdoor stove; wherein in the second position, the supports are adapted to form a cover around the burner unit such that the burner unit does not project outside the cover.

The second position may also be called a packed state, since it will usually be the position the supports should take or are supposed to take when the user does not use the portable stove for heating or cooking but packs it away for transporting it, e.g., in his baggage or backpack. Thus, in the second position, the support arms are folded in such a way that they at least substantially or entirely encapsulate the burner to prevent any sharp metal parts of the burner unit sticking out beyond the outer volume spanned by the support arms when provided in the second position, i.e., the packed or packing state. Thus, in this position, the rest of the items inside the baggage or backpack, respectively, and even the hands or arms of the user are protected from any parts of the burner unit.

In the first position, the supports are unfolded from the packed state to provide a safe and secure footing for the portable outdoor stove when the stove is used for its usual purpose, i.e., the heating or cooking of food, soups, water and the like.

It should be understood that the gas control valve may either comprise connection means so as to connect to an external fuel supply or else the gas control valve may have the possibility to connect a fuel cartridge, such as a gas cartridge, to it or the gas control valve may be adapted such that a cartridge, such as a camping gas cartridge may fit into it.

In the portable outdoor stove as described above, in the second position, the supports may be adapted to cover the gas control valve in addition to the burner unit.

The burner unit may typically be provided directly on the gas control valve, i.e., to a first outer surface of the gas control valve. An interface may be used to accomplish connecting the burner unit with the gas control valve. A corresponding second surface of the gas control valve, facing away from the burner unit, may be adapted as being a flat surface. The supports may be provided near the first outer surface, thereby essentially covering the burner unit when folded into the above-defined second position. Alternatively, the supports may be provided near the second surface of the gas control valve, thereby covering the gas control valve in addition to the burner unit when folded into the second position. It should be understood, that for the first alternative the length of each of the supports should be at least the length of the burner unit whereas in the second alternative the length of each of the supports should be at least the length of the gas control valve plus the length of the burner unit.

In the portable outdoor stove as described above, the number of supports may be three such that the supports may form a tripod when folded into the first position.

Typically, the supports may form a tripod, this one of the easiest and one of the most reliable configuration of supports. It should be understood, though, that in principle, a bipod or multipod might be used.

In the portable outdoor stove as described above, each of the plurality of supports may comprise a pad area at its distal end with respect to the burner unit, such that when the supports are in the second position, the respective pad areas together may form a top cover facing away from the burner unit.

In this way, the respective pad areas of the supports, when the supports are folded into the second position, together may provide an additional, i.e., fourth protection face for the burner unit, thereby providing additional protection of the burner unit.

In the portable outdoor stove as described above, in the second position, the cover formed by the supports may have a cylindrical cross-section.

The supports thus may form a cylinder-like hollow cover for protecting the burner unit when the supports are folded into the second position. Here it may be possible that, when folded into the second position, some or all of the supports are provided adjacent to each other or alternatively the supports are provided overlapping each other.

In the portable outdoor stove as described above, in the second position, the cover formed by the supports may have a polygonal cross-section, in particular, a triangular cross-section.

In the portable outdoor stove as described above, each of the plurality of supports is moveable independently from the other supports, between the first and the second position.

In the portable outdoor stove as described above, each of the plurality of supports may be attached to the gas control valve by a respective hinge. However, it is also possible that the supports are attached to the gas control valve.

In the portable outdoor stove as described above, the hinge may be equipped with a snap-in spring mechanism, such that each of the plurality of supports is adapted to snap into the first or the second position, respectively.

A snap-in spring mechanism makes it easier to fold the supports into the first or the second position. Additionally, the springs may press the supports into the respective position such that the supports may not move out of position.

In the portable outdoor stove as described above, the burner unit may comprise a holder configured to hold a receptacle, such as a pot or a can.

It should be understood that the supports should be configured such that when the supports are folded into the second position, the diameter of the holder fits inside the cover formed by the supports.

The portable outdoor stove as described above may further comprise a locking mechanism configured to lock the supports in the first or the second position, respectively.

The locking mechanism may secure the supports in the first or the second position by locking or fixing these mechanically.

In the portable outdoor stove as describe above, the locking mechanism may be configured to allow locking of the supports only when all of the supports have been folded into a corresponding same position, the position being either the first position or the second position.

In this way, the locking mechanism may enhance security for the entire system, i.e., for the first position, especially when in use for cooking, the portable outdoor stove together with any pots, cans are securely supported, in the second position, the packed portable outdoor stove may not accidently unpack itself against the intent of the user.

In the portable outdoor stove as described above, the locking mechanism may comprise a gas control handle and a valve spindle.

An additional gas control handle, typically substantially shorter than the supports may be provided together with the valve spindle.

In the portable outdoor stove as described above the gas control handle may be foldable into at least a position corresponding to the second position of the supports, such that in the position of the gas control handle, the gas control handle is aligned with the supports.

In the portable outdoor stove as described above, the valve spindle may be adapted to be locked by the gas control handle in its position.

BRIEF DESCRIPTION OF THE DRAWINGS

FIGS. 2A and 2B: Schematic views of the supports of the portable outdoor stove of FIG. 1.

FIG. 5: Perspective exploded view of a portable outdoor stove having supports folded into the first position according to a further embodiment.

DETAILED DESCRIPTION

Figure 1:
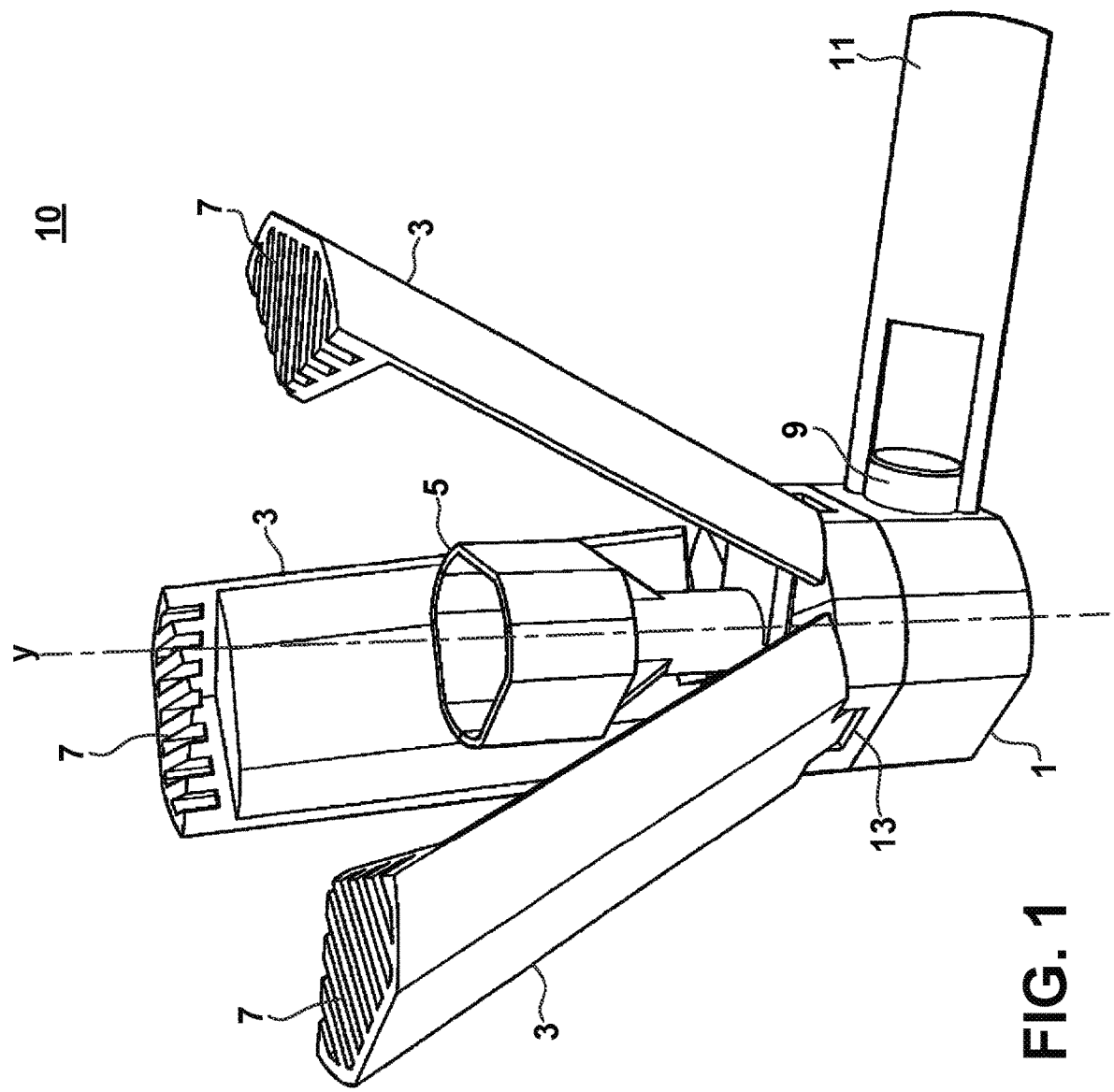
FIG. 1: Perspective view a portable outdoor stove having supports folded into a first position.

FIG. 1 illustrates a schematic view a portable outdoor stove having supports folded into a first position. In FIG. 1, a portable outdoor stove 10 is shown. The portable outdoor stove 10 comprises a gas control valve 1 supporting a burner unit 5. That is, the burner unit 5 is provided directly on the gas control valve 1. A vertical symmetry axis y of the gas control valve 1 is the same symmetry axis for the burner unit 5. In this way, the gas control valve 1 and the burner unit 5 are vertically aligned with respect to the axis y. The burner unit 5 of FIG. 1 is dockable by or connectable to a fuel supply means (not shown), such that fuel, e.g., liquid petrol gas, LPG, in disposable portable cartridge may be provided for the burner unit 5 for heating or cooking purposes.

FIG. 1 further illustrates supports 3. In FIG. 1, three supports 3 are shown. It should be understood, however, that a different number of supports may be used, the number being larger than two. The supports 3 typically have a convex shape with respect to the vertical symmetry axis y. As shown in FIG. 1, the supports 3 are unfolded into a first or open position. The supports 3 each typically are the same. Thereby the vertical height of each of the supports 3 with respect to the gas control valve 1 is the same. Thus, the supports 3 provide for an even rest or hold of a receptacle or pot (not shown in FIG. 1, cf. FIG. 4), which a user intends to put on the portable outdoor stove 10 for heating. Each of the supports 3 shown in FIG. 1 further comprises a pad area 7 at its distal end with respect to the burner unit 5. The pad area is formed when the supports 3 are in the second position, the respective pad areas 7 together forming an enlarged top cover area facing away from the burner unit 5. Such a top cover 7T is illustrated in FIG. 3.

As illustrated in FIG. 1, the supports 3 each are connected to the gas control valve 1 by a respective hinge 13. The hinges 13 may be fitted with a mechanism to prevent the supports 3 of being unfolded beyond a maximum angle, cf. FIGS. 2A and 2B. Each of the hinges 13 may be equipped with a snap-in mechanism, in particular, using a spring, such that each of the plurality of supports 3 may be adapted to snap into the first or the second position, respectively. In FIG. 1, it is further illustrated that the supports 3 comprise a locking mechanism configured to lock the supports 3 in the first or the second position, respectively. The locking mechanism may be configured to allow locking of the supports only when all of the supports have been folded into a corresponding same position, the position being either the first position or the second position. In FIG. 1, the locking mechanism comprises a gas control handle 11 and a valve spindle 9. Here, the gas control handle 11 is foldable into at least a position corresponding to the second position of the supports 3, such that in the position of the gas control handle 11, the gas control handle 11 is aligned with the supports 3, cf. FIG. 2. The valve spindle 9 of FIG. 1 is adapted to be locked by the gas control handle 11 into its position.

For the respective pad areas 7, it is illustrated in FIG. 2B that the pad areas may be inclined at least by an angle α with respect to the horizontal axis x. Here, the horizontal axis x is perpendicular to the vertical axis y. Typically, the angle α may be within 5-25 degrees with respect to the horizontal axis x, as shown in FIG. 2B. FIG. 2B illustrates a cross section of one support 3, here only schematically illustrated, having one pad area 7 inclined by an angle α of about 20 degrees. FIG. 2B refers to the afore-mentioned second position, here labelled P2, i.e., the support shown in FIG. 2B is in the packed state. In contrast, in FIG. 2A, the support 3 is unfolded from the packed state into the first position, here labelled P1. In the first position, P1, the support 3 is tilted by the same angle α against the vertical axis y. Due to this tilt, the support area 7 of the support 3 is now substantially even with respect to the horizontal axis x, as shown in FIG. 2A. As indicated, in this example, α is 20 degrees but different values may be used to achieve evenness of the support area 7.

Figure 3:
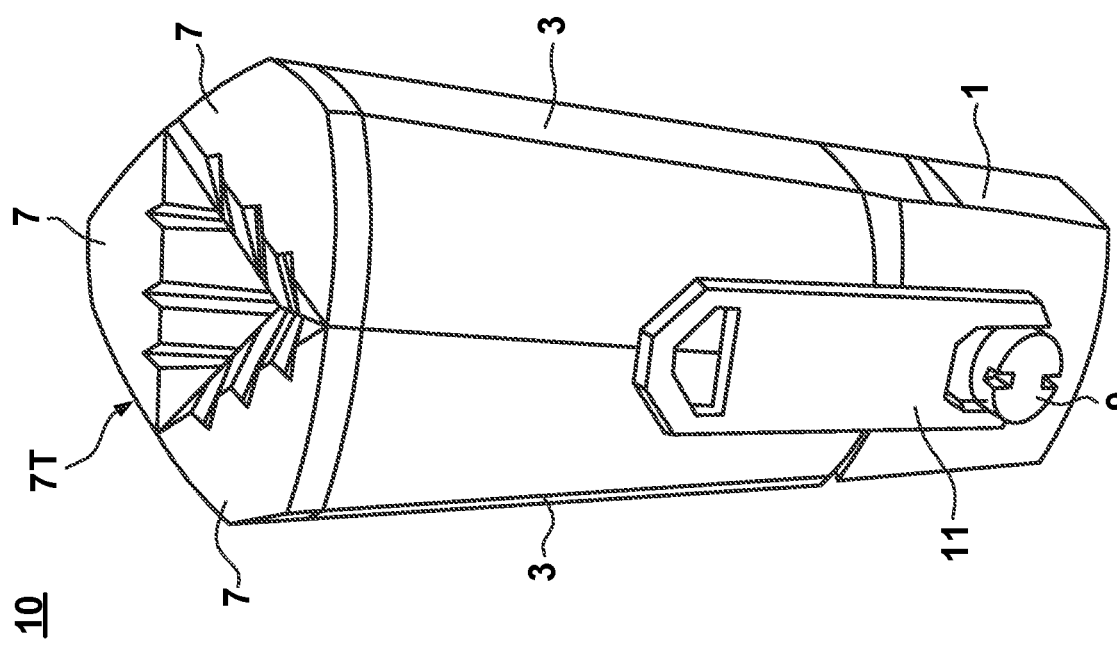
FIG. 3: Perspective view of the portable outdoor stove of FIG. 1 having the supports folded into the second position.

FIG. 3 illustrates the portable outdoor stove 10 of the embodiment of FIGS. 1, 2A and 2B, in the folded state. In particular, FIG. 3 illustrates the gas control handle 11 being aligned with the supports 3 in the packed state, i.e., the second position P2 of FIG. 2B.

Figure 4:
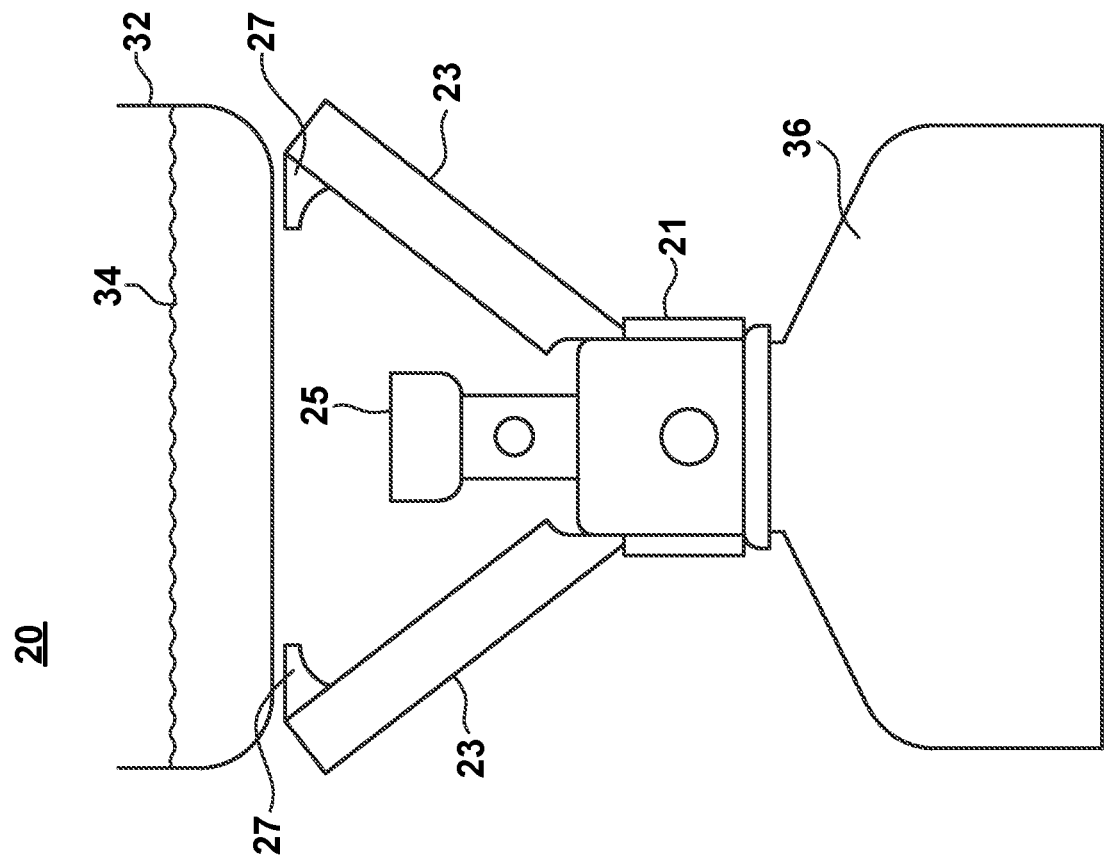
FIG. 4: Side view of a portable outdoor stove similar to the one of FIGS. 1 and 3 shown in a use position.

FIG. 4 illustrates a cross-sectional view of a portable outdoor stove 20, which may be essentially similar to the portable outdoor stove 10 according to the previous embodiment. In FIG. 4, the portable outdoor stove 20 comprises a gas control valve 21 and supports 23, of which only two are shown for illustrative purposes. The supports 23 are shown in the unfolded state. A burner unit 25, which is similar to the burner unit 5 of FIG. 1, is shown. The supports 23 are shown with respective pad areas 27. The pads 27 of the supports 23 form an even surface area substantially horizontally. The surface area is shown to support a receptacle 32 with some fluid 34 to be heated by the burner unit 25. Further, FIG. 4 illustrates a fuel cartridge 36, not necessarily drawn to scale, for providing fuel to the portable outdoor stove 20. The fuel cartridge 36 is connected by well-understood connection means with the burner unit 25 through the gas control valve 21. The fuel cartridge 36 may be docked or fixed by screwing or the like. The fixation may be released once the cartridge 36 has been used, i.e., to disconnect the portable outdoor stove 20, or when the fuel cartridge 36 needs to be replaced, etc.

FIG. 5 shows a further embodiment of a portable outdoor stove denoted by reference numeral 40. The portable outdoor stove 40 comprises a gas control valve 41, a burner unit 45 having a top area 45A and supports 43. For illustrative purposes only, FIG. 5 shows only two supports 43, however it should be understood that the portable outdoor stove 40 of this embodiment has three supports 43, cf. FIG. 6. Further, the portable outdoor stove 40 comprises a gas control handle 51 and a valve spindle 49. The gas control handle is connected to the valve spindle so it may actuate the valve spindle 49. The three supports 43 that are shown are connected to the gas control valve 41 with hinges 53. The hinges may be connected to the gas control valve 41 by respective dowel pins 42. The portable outdoor stove 40 may be similar to the portable outdoor stove 10 or 20 discussed. The functionality of folding the supports 43 to a packed state as discussed with respect to FIGS. 1 and 3 is the same as for the supports 3 of FIGS. 1 and 3. In addition, the properties of the hinges 53 are the same as for the hinges 13 of FIGS. 1 and 3.

In FIG. 5, a pot support holder is shown comprising a central ring 44 and arms 44A arranged so as to correspond to the respective supports 43. Since the portable outdoor stove 40 of FIG. 5 has three supports 43, the pot support holder comprises three arms 44A. Further, each of the supports 43 has a hole 43H. The holes 43H correspond to the arms 44A such that the tip portion of each arm 44A, i.e., the portion facing away from the ring 44, may fit into one corresponding hole 43H for locking. This will further be explained for FIG. 6.

In FIG. 5, the supports 43 in part are of a cylindrical shape, or curved shape, instead of a polygonal shape as in FIG. 1. Thus, in the second position, i.e., the packed state, these supports 43 essentially form a cylindrical cover covering the burner unit 45. The supports 43 may be slightly overlapping at the respective neighboring edges along the vertical direction or may be directly adjacent. In any case, the cylindrically shaped cover formed by the supports 43 in the packed state encapsulates the burner unit 45 in such a way that no elements of the burner unit 45 project outside the cylindrical cover. In addition, the burner unit 45 of the portable outdoor stove 40 has a cylindrical shape.

The supports 43, unlike the supports 3 of FIGS. 1, 2, and 3 or the supports 23 of FIG. 4 do not have pad areas at their respective distal ends. Thereby, even less material may be used and the overall weight of the portable outdoor stove 40 is even further reduced. The unfolded supports 43, in the position for using the portable outdoor stove 40 for cooking provide support for a receptacle due to their curved shape.

Figure 6:
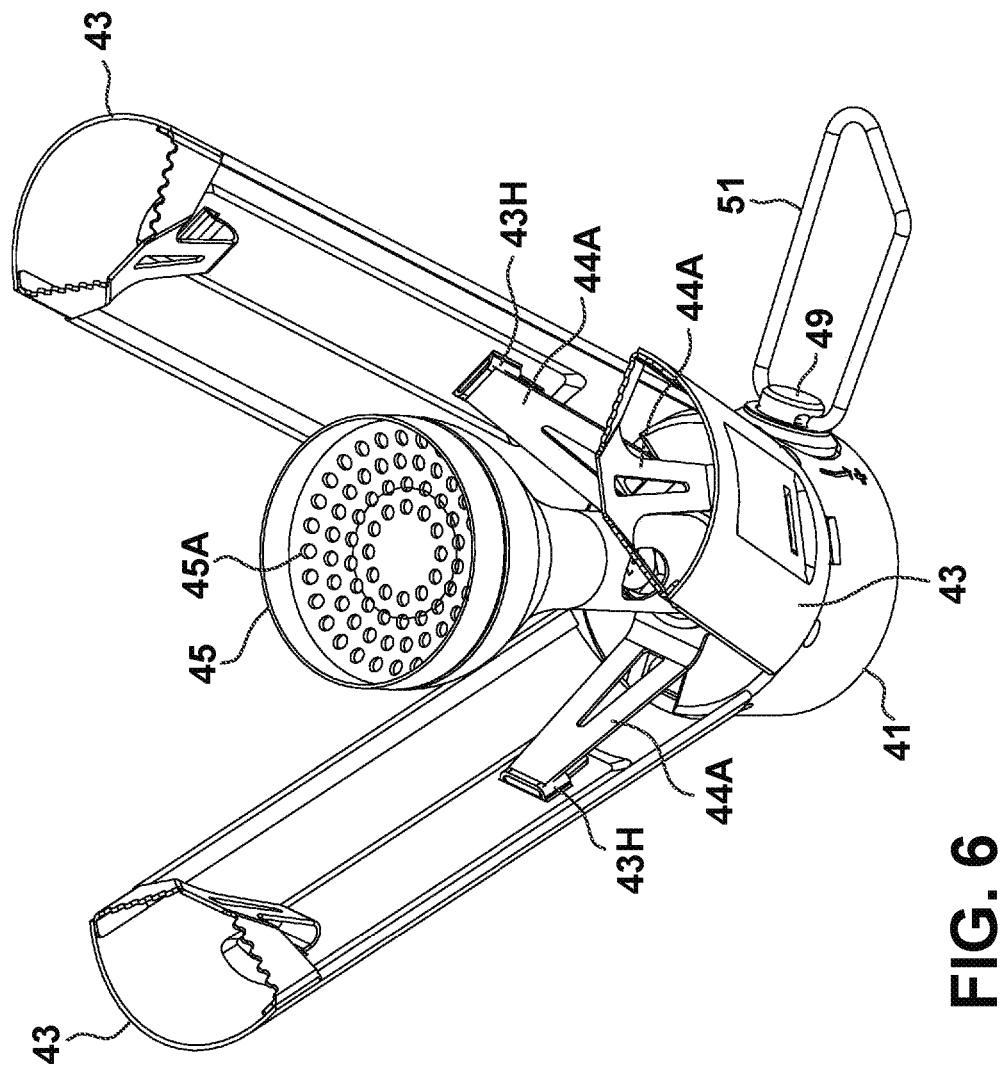
FIG. 6: Perspective view of the portable outdoor stove of FIG. 5 having the supports locked in the first position.

FIG. 6 illustrates the same elements as in FIG. 5 but now in a non-exploded view. In particular, FIG. 6 illustrates each of the arms 44A fit into a corresponding hole 43H for locking the supports 43.

Figure 7:
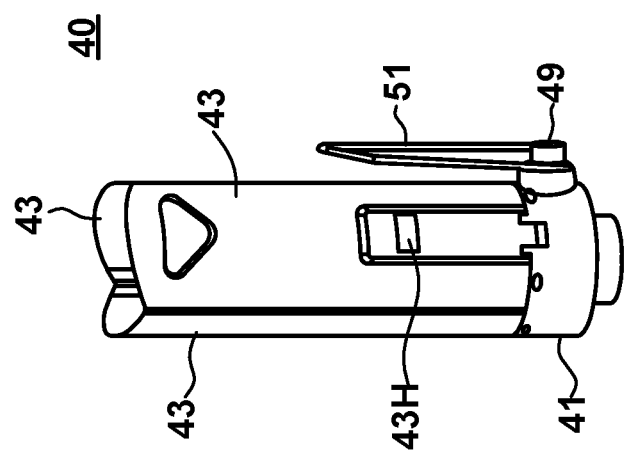
FIG. 7: Perspective view of the portable outdoor stove of FIGS. 5 and 6, having its supports folded into the second position.

FIG. 7 refers to the embodiment of FIGS. 5 and 6, showing the portable outdoor stove 40 in the packed state. It should be noted that the length of the supports 43 in the packed state with respect to the gas control valve is longer than that of the burner unit 45 such that even a top area 45A of the burner unit 45, i.e., the region of the burner unit 45 closest to a receptacle, will not project outside the cylindrical cover formed by the supports 43 in the packed state.

What is claimed is:

1. A portable outdoor stove, comprising:
   a gas control valve, the gas control valve being dockable by a fuel supply means;
   a burner unit provided on the gas control valve; and
   a plurality of supports attached to the portable outdoor stove, the supports being foldable at least between a first position and a second position;
   wherein in the first position, the supports are adapted to provide a hold for a receptacle to be heated by the burner unit;
   wherein in the second position, the supports are adapted to form a cover around the burner unit such that the burner unit does not project outside the cover; and
   a locking mechanism configured to lock the supports in the first or the second position, respectively;
   wherein the locking mechanism is configured to allow locking of the supports only when all of the supports have been folded into a corresponding same position, the corresponding same position being either the first position or the second position.

2. The portable outdoor stove according to claim 1, wherein in the second position, the supports cover the gas control valve in addition to the burner unit.

3. The portable outdoor stove according to claim 1, wherein the plurality of supports consists of three supports such that the supports form a tripod-like holding structure when folded into the first position.

4. The portable outdoor stove according to claim 1, wherein each support of the plurality of supports comprises a pad area at its distal end with respect to the burner unit, such that when the supports are in the second position, the respective pad areas together form a top cover facing away from the burner unit.

5. The portable outdoor stove according to claim 4, wherein when the supports are in the first position, the respective pad areas together provide additional surface area for placing the receptacle on the additional surface area.

6. The portable outdoor stove according to claim 1, wherein in the second position, the cover formed by the supports has a cylindrical cross-section.

7. The portable outdoor stove according to claim 1, wherein in the second position, the cover formed by the supports has a polygonal cross-section.

8. The portable outdoor stove according to claim 1, wherein each support of the plurality of supports is moveable independently from the other supports of the plurality of supports, between the first and the second position.

9. The portable outdoor stove according to claim 1, wherein each support of the plurality of supports is attached to the gas control valve by a respective hinge.

10. The portable outdoor stove according to claim 9, wherein each respective hinge is equipped with a snap-in spring mechanism, such that each support of the plurality of supports is adapted to snap into the first or the second position, respectively.

11. The portable outdoor stove according to claim 1, wherein the locking mechanism comprises a gas control handle and a valve spindle.

12. The portable outdoor stove according to claim 11, wherein the gas control handle is foldable into at least a position corresponding to the second position of the supports, such that in the position of the gas control handle, the gas control handle is aligned with the supports.

13. The portable outdoor stove according to claim 11, wherein the gas control handle is adapted to lock the valve spindle in its position.

\* \* \* \* \*